(12) United States Patent
Uesugi

(10) Patent No.: US 11,871,112 B2
(45) Date of Patent: Jan. 9, 2024

(54) IMAGE STABILIZATION APPARATUS AND METHOD AND IMAGE CAPTURING APPARATUS

(71) Applicant: CANON KABUSHIKI KAISHA, Tokyo (JP)

(72) Inventor: Tomomi Uesugi, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/588,496

(22) Filed: Jan. 31, 2022

(65) Prior Publication Data
US 2022/0256084 A1      Aug. 11, 2022

(30) Foreign Application Priority Data
Feb. 5, 2021   (JP) .................. 2021-017743

(51) Int. Cl.
*H04N 23/68*   (2023.01)
*G02B 27/64*   (2006.01)

(52) U.S. Cl.
CPC ......... *H04N 23/683* (2023.01); *G02B 27/646* (2013.01); *H04N 23/685* (2023.01)

(58) Field of Classification Search
CPC .............. G02B 27/646; H04N 23/6811; H04N 23/6812; H04N 23/685; H04N 23/683
See application file for complete search history.

(56) References Cited

U.S. PATENT DOCUMENTS

2014/0184836 A1* 7/2014 Watanabe .......... H04N 23/6845
                                                    348/208.5

FOREIGN PATENT DOCUMENTS

JP             4789614 B2     10/2011

* cited by examiner

*Primary Examiner* — Nicholas G Giles
(74) *Attorney, Agent, or Firm* — Cowan, Liebowitz & Latman, P.C.

(57) ABSTRACT

An image stabilization apparatus comprises a motion vector detector that detects a motion vector from images repeatedly output from an image sensor; a first calculator that calculates a first image stabilization coefficient based on the motion vector; a second calculator that calculates a second image stabilization coefficient based on acceleration of shake of an image capturing apparatus; a determination unit that selects either of the first or the second image stabilization coefficient based on information about accuracy of detection of the motion vector; and a translational shake calculator that calculates an amount of translational shake using the first or the second image stabilization coefficient selected by the determination unit. In a case where the information indicates that the accuracy is low, the determination unit selects the second image stabilization coefficient, and select the first image stabilization coefficient otherwise.

17 Claims, 9 Drawing Sheets

IMAGE STABILIZATION APPARATUS AND METHOD AND IMAGE CAPTURING APPARATUS

BACKGROUND OF THE INVENTION

Field of the Invention

The present invention relates to an image stabilization apparatus and method and image capturing apparatus and more particularly to an image stabilization apparatus and method and image capturing apparatus that perform translational image stabilization.

Description of the Related Art

In recent years, the number of cameras equipped with image stabilization control devices has been increasing in the market. In order to enable shooting of images without blurring even if camera shake occurs during exposure, it is necessary to detect angular shake and translational shake of the camera, and move the image stabilization unit according to the detected values to cancel the shake.

In recent years, improvements in the performance of angular velocity sensors have made it possible to detect angular shake in a wider frequency band than before, especially in a low frequency band. Therefore, the image stabilization performance with respect to the angular shake of the camera caused by camera shake has been improved. On the other hand, due to the improvement of the image stabilization performance with respect to the angular shake, the translational shake has become conspicuous. As a method of translational image stabilization, Japanese Patent No. 4789614 describes a technique in which the ratio of an output of an accelerometer to an output of an angular velocity meter is obtained as a radius of rotation, the translational shake is obtained from the radius of rotation and the output of the angular velocity meter, and the translational shake is cancelled by driving a correction unit.

However, due to the improvement in the performance of image stabilization, even if the exposure period is long, it has become possible to take pictures with a camera being hand-held, which makes it necessary to perform image stabilization in a lower frequency band. An image signal is used in addition to a signal from the accelerometer in order to perform image stabilization in a lower frequency band, and the method of utilizing the image signal becomes an issue.

SUMMARY OF THE INVENTION

The present invention has been made in consideration of the above situation, and performs translational image stabilization more accurately according to the conditions of the subject and the image capturing apparatus.

According to the present invention, provided is an image stabilization apparatus comprising at least one processor and/or circuitry which functions as: a motion vector detector that detects a motion vector from images repeatedly output from an image sensor; a first calculator that calculates a first image stabilization coefficient to be used for calculating an amount of translational shake based on the motion vector; a second calculator that calculates a second image stabilization coefficient to be used for calculating an amount of translational shake based on acceleration of shake of an image capturing apparatus; a determination unit that selects either of the first image stabilization coefficient or the second image stabilization coefficient based on information about accuracy of detection of the motion vector by the motion vector detector; and a translational shake calculator that calculates an amount of translational shake using the first image stabilization coefficient or the second image stabilization coefficient selected by the determination unit, wherein, in a case where the information indicates that the accuracy is low, the determination unit selects the second image stabilization coefficient, and select the first image stabilization coefficient otherwise.

Further, according to the present invention, provided is an image stabilization apparatus comprising at least one processor and/or circuitry which functions as: a first calculator that calculates an image stabilization coefficient to be used for calculating an amount of translational shake based on a motion vector obtained from images repeatedly output from an image sensor; a gain unit that determines a gain based on a shutter speed at a time of shooting an image and a shooting distance; and a second calculator that calculates an amount of translational shake using the gain determined by the gain unit and the image stabilization coefficient calculated by the first calculator, wherein the gain unit makes the gain larger in a case where the shutter speed is a first shutter speed than in a case where the shutter speed is a second shutter speed which is faster than the first shutter speed, and wherein the gain unit makes the gain larger in a case where the shooting distance is a first shooting distance than in a case where the shooting distance is a second shooting distance which is longer than the first shooting distance.

Furthermore, according to the present invention, provided is an image capturing apparatus comprising: an image sensor; and an image stabilization apparatus that comprises at least one processor and/or circuitry which functions as: a motion vector detector that detects a motion vector from images repeatedly output from the image sensor; a first calculator that calculates a first image stabilization coefficient to be used for calculating an amount of translational shake based on the motion vector; a second calculator that calculates a second image stabilization coefficient to be used for calculating an amount of translational shake based on acceleration of shake of an image capturing apparatus; a determination unit that selects either of the first image stabilization coefficient or the second image stabilization coefficient based on information about accuracy of detection of the motion vector by the motion vector detector; and a translational shake calculator that calculates an amount of translational shake using the first image stabilization coefficient or the second image stabilization coefficient selected by the determination unit, wherein, in a case where the information indicates that the accuracy is low, the determination unit selects the second image stabilization coefficient, and selects the first image stabilization coefficient otherwise.

Further, according to the present invention, provided is an image capturing apparatus comprising: an image sensor; and an image stabilization apparatus that comprises at least one processor and/or circuitry which functions as: a first calculator that calculates an image stabilization coefficient to be used for calculating an amount of translational shake based on a motion vector obtained from images repeatedly output from an image sensor; a gain unit that determines a gain based on a shutter speed at a time of shooting an image and a shooting distance; and a second calculator that calculates an amount of translational shake using the gain determined by the gain unit and the image stabilization coefficient found by the first calculator, wherein the gain unit makes the gain larger in a case where the shutter speed is a first shutter speed than in a case where the shutter speed is a second shutter speed which is faster than the first shutter speed, and wherein the gain unit makes the gain larger in a case where the shooting distance is a first shooting distance than in a case where the shooting distance is a second shooting distance which is longer than the first shooting distance.

Further, according to the present invention, provided is an image stabilization method comprising: detecting a motion vector from images repeatedly output from an image sensor; calculating a first image stabilization coefficient to be used for calculating an amount of translational shake based on the motion vector; calculating a second image stabilization coefficient to be used for calculating an amount of translational shake based on acceleration of shake of an image capturing apparatus; selecting either of the first image stabilization coefficient or the second image stabilization coefficient based on information about accuracy of detection of the motion vector; and calculating an amount of translational shake using selected one of the first image stabilization coefficient or the second image stabilization coefficient, wherein, the second image stabilization coefficient is selected in a case where the information indicates that the accuracy is low, and the first image stabilization coefficient is selected otherwise.

Further, according to the present invention, provided is an image stabilization method comprising: calculating an image stabilization coefficient to be used for calculating an amount of translational shake based on a motion vector obtained from images repeatedly output from an image sensor; determining a gain based on a shutter speed at a time of shooting an image and a shooting distance; and calculating an amount of translational shake using the gain and the image stabilization coefficient, wherein the gain is made larger in a case where the shutter speed is a first shutter speed than in a case where the shutter speed is a second shutter speed which is faster than the first shutter speed, and wherein the gain is made larger in a case where the shooting distance is a first shooting distance than in a case where the shooting distance is a second shooting distance which is longer than the first shooting distance.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

DESCRIPTION OF THE EMBODIMENTS

Figure 1A:
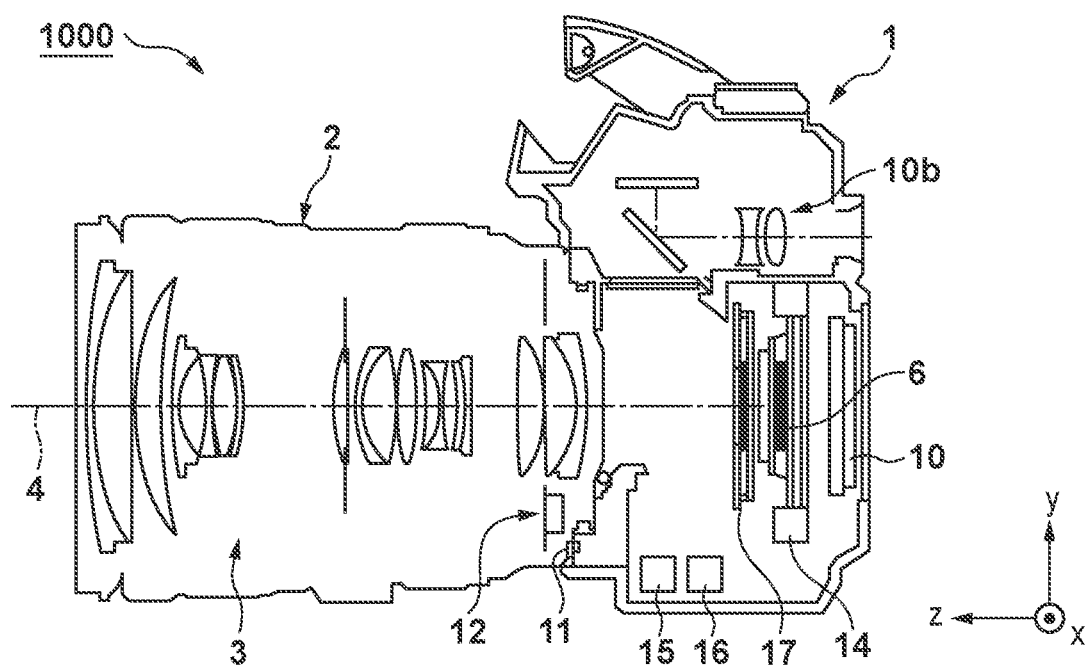
FIG. 1A is a central sectional view of an image capturing apparatus according to a first embodiment of the present invention.

Hereinafter, embodiments will be described in detail with reference to the attached drawings. Note, the following embodiments are not intended to limit the scope of the claimed invention, and limitation is not made an invention that requires a combination of all features described in the embodiments. Two or more of the multiple features described in the embodiments may be combined as appropriate. Furthermore, the same reference numerals are given to the same or similar configurations, and redundant description thereof is omitted.

First Embodiment

Figure 1B:
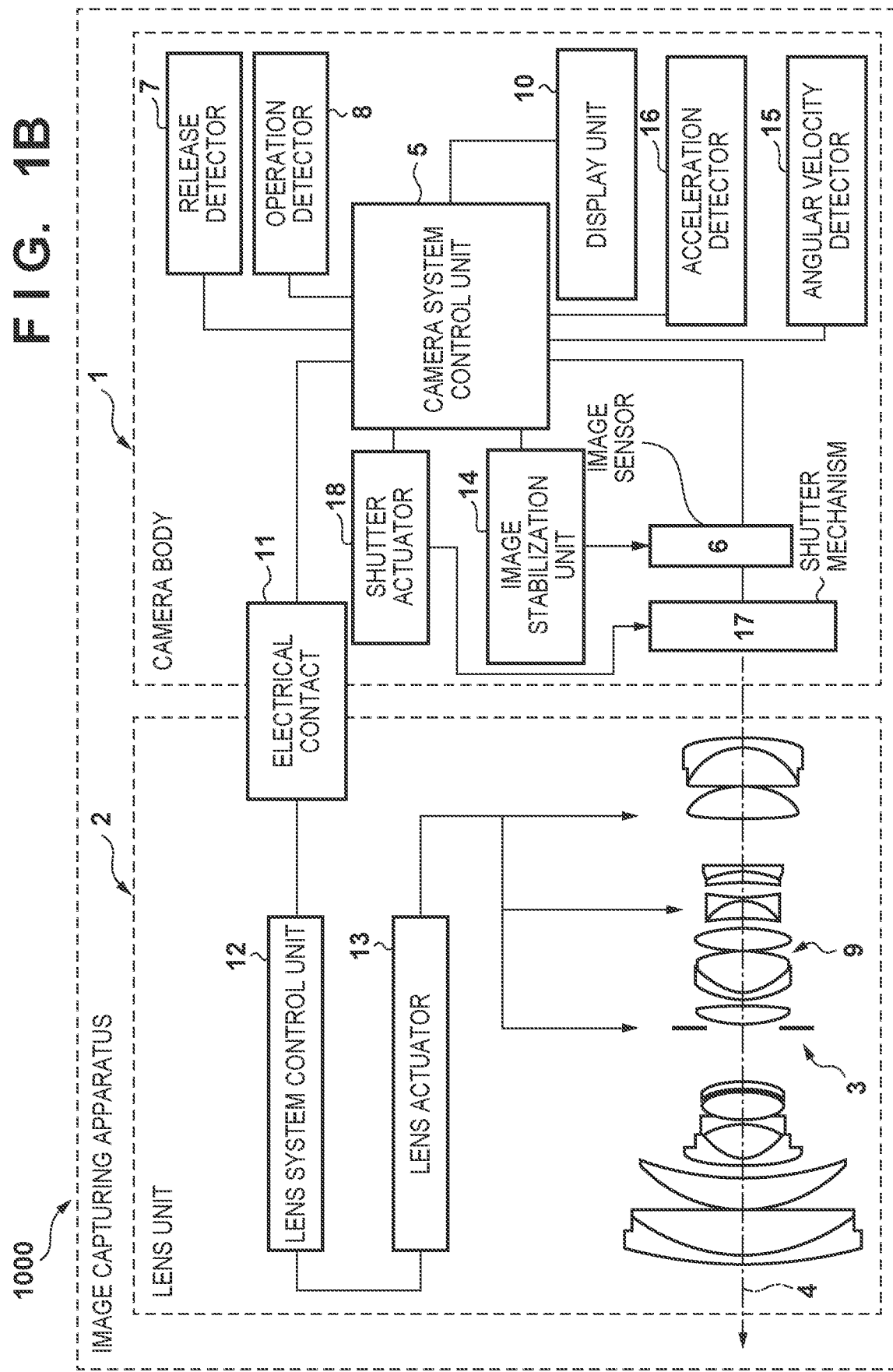
FIG. 1B is a block diagram showing a brief functional configuration of the image capturing apparatus according to the first embodiment.

FIGS. 1A and 1B are views showing an image capturing apparatus 1000 equipped with an image stabilization control device according to the first embodiment, and specifically, FIG. 1A is a central cross-sectional view of the image capturing apparatus 1000, and FIG. 1B is a block diagram which shows a functional configuration of the image capturing apparatus 1000.

As shown in FIG. 1A, the image capturing apparatus 1000 of the present embodiment mainly includes a camera body 1 and a lens unit 2 that can be attached to and detached from the camera body 1. The camera body 1 and the lens unit 2 are electrically connected via an electrical contact 11. It should be noted that the image capturing apparatus of the present invention is not limited to this configuration, and may be an image capturing apparatus in which a camera body and a lens unit are integrally configured.

The lens unit 2 includes an imaging optical system 3 comprised of a diaphragm and a plurality of lenses including a focus lens, a zoom lens and an image stabilization lens 9 arranged on an optical axis 4, and a lens system control unit 12. Further, the camera body 1 includes an image sensor 6, a rear display device 10a, an electronic view finder (EVF) 10b, an image stabilization unit 14, an angular velocity detector 15, an acceleration detector 16, and a shutter mechanism 17.

In FIG. 1A, the z-axis is parallel to the optical axis 4. The x-axis and y-axis are orthogonal to the z-axis and parallel to sides of the image sensor 6, respectively. In addition, in order to make the figure easier to see, the origin of the coordinate is written outside the image capturing apparatus 1000 in FIG. 1A, but the origin is actually located at the center of the image capturing apparatus 1000.

Further, as shown in FIG. 1B, the lens unit 2 further includes a lens actuator 13 for actuating the focus lens, the zoom lens, the image stabilization lens 9, the diaphragm, and the like included in the imaging optical system 3. Further, the camera body 1 further includes a camera system control unit 5, a release detector 7, an operation detector 8, a display unit 10, and a shutter actuator 18. The display unit 10 includes the rear display device 10a provided on the back surface of the camera body 1 shown in FIG. 1A and the EVF 10b provided in a finder of the camera body 1.

The release detector 7 detects an open/close signal of a release switch (not shown) that opens/closes in response to pressing of the release button, and sends the detected open/close signal to the camera system control unit 5. The release detector 7 usually detects two types of open/close signals from a two-stage switch; one is the open/close signal from a switch that turns on when the release button is pressed halfway (hereinafter referred to as "SW1") and the other is the open/close signal of a switch that turns on when the release button is fully pressed (hereinafter referred to as "SW2").

The operation detector 8 detects photographer's operations for instructing, for example, shutter speed, F value, and mode setting.

Light from a subject passing through the imaging optical system 3 of the lens unit 2 is formed on an imaging surface of the image sensor 6 while the shutter mechanism 17 is open. The lens actuator 13 receives a control signal from the lens system control unit 12 and actuates the imaging optical system 3 so that a good image can be formed on the image sensor 6. Further, the shutter mechanism 17 is controlled and actuated by the shutter actuator 18 so that the exposure at the shutter speed set by the photographer or determined by the camera system control unit 5 is performed. The image sensor 6 photoelectrically converts the incident light and outputs an electric signal (image signal) corresponding to an amount of light.

The camera system control unit 5 calculates a control amount for image stabilization to reduce the effect of camera shake based on the signals output from the release detector 7, operation detector 8, angular velocity detector 15, and acceleration detector 16, and output the control amount to the image stabilization unit 14 and the lens system control unit 12.

The lens system control unit 12 outputs a command based on the control amount received from the camera system control unit 5 to the lens actuator 13. The lens actuator 13 actuates the image stabilization lens 9 in the x and y directions of FIG. 1A, and performs image stabilization that takes into account both angular shake and translational shake.

On the other hand, the image stabilization unit 14 actuates the image sensor 6 based on the control amount received from the camera system control unit 5. The image stabilization unit 14 actuates the image sensor 6 in the x-direction and the y-direction of FIG. 1A, thereby performs image stabilization that takes into account both angular shake and translational shake. In addition, the image stabilization unit 14 rotationally actuates the image sensor 6 around the z-axis to perform image stabilization that takes into account both angular shake and translational shake caused by rotational movement around the z-axis.

The correction method based on the control amount received from the camera system control unit 5 is not limited to this, and other methods may be used. For example, so-called electronic image stabilization, which stabilizes an image by shifting the cropping position of an image output from the image sensor 6, may be used, and the electronic image stabilization and the image stabilization that actuates the image sensor 6 described above may be used in combination as appropriate.

Image plane shake occurs in the image sensor 6 when the shake occurs in the image capturing apparatus 1000. Hereinafter, the image plane shake of the image sensor 6 due to translational shake is referred to as "image plane transla-tional shake", and the image plane shake of the image sensor 6 due to angular shake is referred to as "image plane angular shake".

Figure 2:
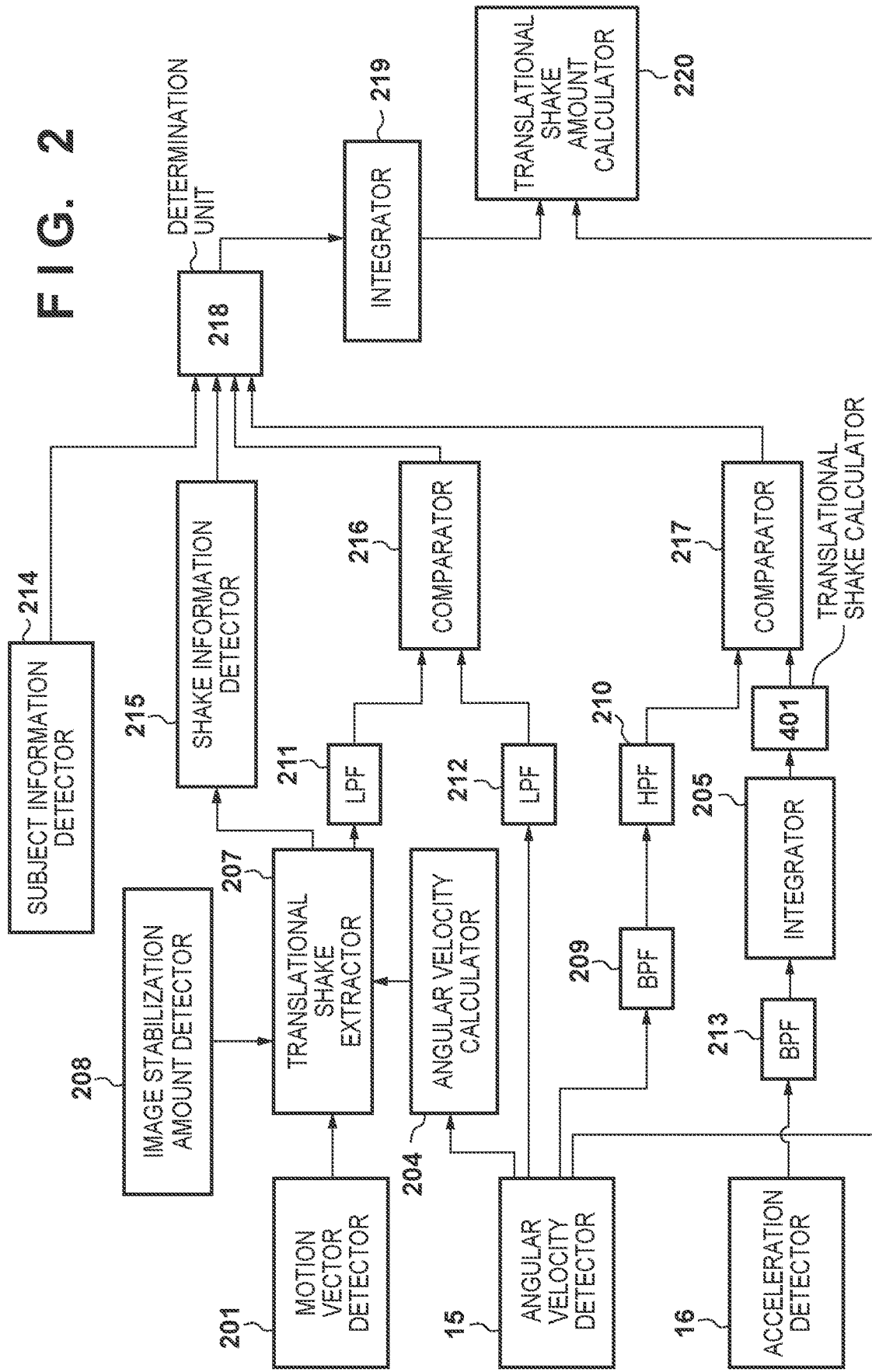
FIG. 2 is a block diagram showing a configuration for calculating an amount of translational shake according to the first embodiment.

FIG. 2 is a block diagram showing a configuration for calculating translational shake, the angular velocity detector 15 and the acceleration detector 16 in the camera system control unit 5.

A motion vector detector 201 detects the moving velocity of a feature point from the movement amount of the feature points in images between frames, thereby detecting velocities of the image plane shake of the image sensor 6 in the x-axis direction, the y-axis direction, and the z-axis direction of FIG. 1A. When the subject is not moving, the moving velocity of the feature point represents the velocity of the image plane shake generated by the shake of the image capturing apparatus. When the subject is moving, the moving velocity of the feature point represents the sum of the velocity of the image plane shake generated by the shake of the image capturing apparatus and the moving velocity of the subject.

Further, the velocity of the image plane shake detected by the motion vector detector 201 includes an image plane velocity of angular shake and an image plane velocity of translational shake. The image plane velocity of angular shake is the velocity of the shake exerted on the image plane by the image plane angular shake, and the image plane velocity of translational shake is the velocity of the shake exerted on the image plane by the image plane translational shake.

The image stabilization amount detector 208 detects and outputs the image plane velocity of the remnant of angular shake reduced by the lens actuator 13 and the image stabilization unit 14.

The angular velocity detector 15 detects the angular velocities around the x-axis, y-axis, and z-axis of the coordinate axes shown in FIG. 1A, and outputs angular velocity signals. An angular velocity calculator 204 calculates the image plane velocities of the angular shake by multiplying the angular velocity signals output from the angular velocity detector 15 by the focal length, and outputs the calculated image plane velocities of the angular shake.

A translational shake extractor 207 uses the output of the motion vector detector 201, the output of the image stabilization amount detector 208, and the output of the angle velocity calculator 204 to calculate the image plane velocity of translational shake and the image plane velocity of the remnant of the angular shake which has been reduced. Here, a method of calculating the image plane velocity of translational shake and the image plane velocity of the remnant of the angular shake which has been reduced will be described with reference to FIG. 3.

Figure 3:
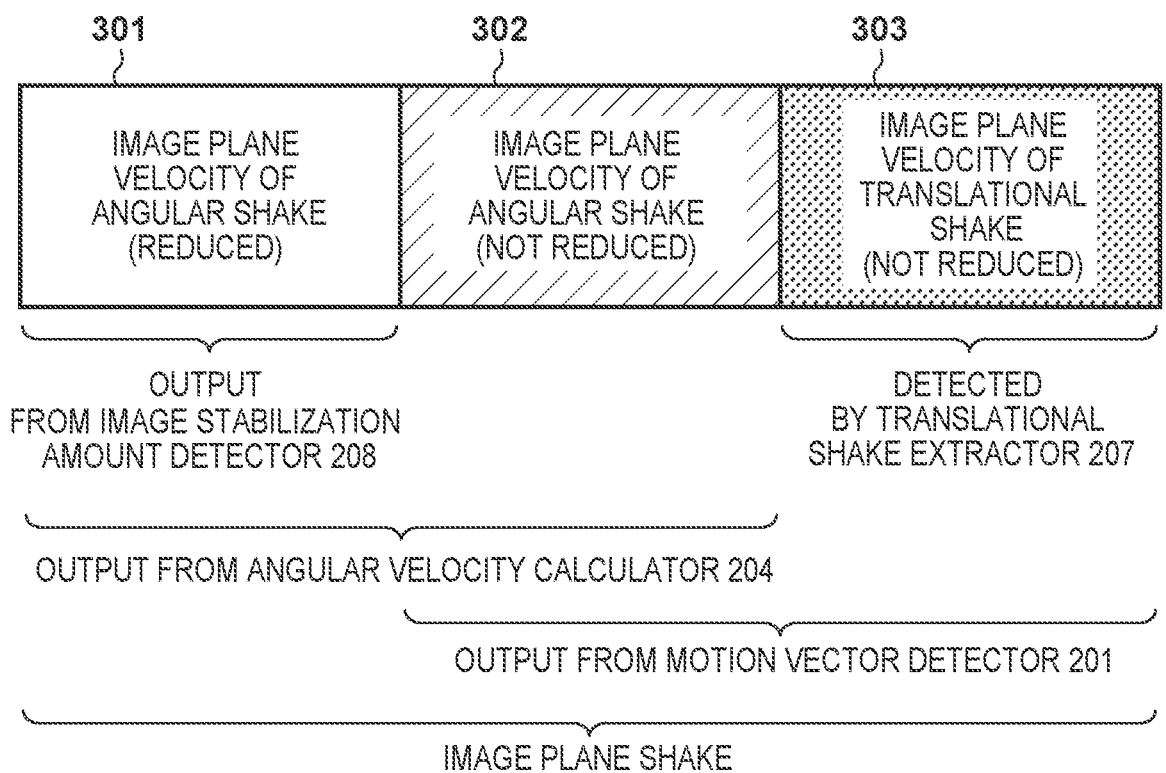
FIG. 3 is a diagram explaining an operation performed by a translational shake extractor according to the first embodiment.

FIG. 3 is a conceptual diagram of an operation performed by the translational shake extractor 207. The sum of an image plane velocity of angular shake (after reduction) 301, an image plane velocity of angular shake (before reduction) 302, and an image plane velocity of translational shake (before reduction) 303 shown in FIG. 3 corresponds to the velocity of the image plane shake that appears on the image plane of the image sensor 6 when no image stabilization operation is performed.

The image plane velocity of angular shake (after reduction) 301 is the output of the image stabilization amount detector 208. The output of the angular velocity calculator 204 corresponds to the sum of the image plane velocity of angular shake (after reduction) 301 and the image plane velocity of angular shake (before reduction) 302. Therefore, the image plane velocity of angular shake (before reduction)

302 can be obtained by subtracting the output of the image stabilization amount detector 208 from the output of the angular velocity calculator 204.

Further, the output of the motion vector detector 201 corresponds to the sum of the image plane velocity of angular shake (before reduction) 302 and the image plane velocity of translational shake (before reduction) 303. Therefore, the image plane velocity of translational shake (before reduction) 303 can be obtained by subtracting the image plane velocity of angular shake (before reduction) 302 from the output of the motion vector detector 201.

A LPF 211 receives the image plane velocity of translational shake (before reduction) 303 as an input from the translational shake extractor 207, applies a low-pass filter, extracts a portion in a specific frequency band, and outputs it. The frequency band of shake to be extracted is a band of 10 Hz or less which includes the frequency of camera shake. However, since the dominant frequency band of shake when performing image shooting at slow shutter speed shifts to the low frequency side, the frequency band of the filter may be changed according to conditions such that the frequency band of 1 Hz or less of shake is extracted.

A LPF 212 applies a low-pass filter to the angular velocity signals output from the angular velocity detector 15 to extract signals in a specific frequency band, and outputs them. The frequency band that the LPF 212 extracts is basically the same as the frequency band that the LPF 211 extracts.

A comparator 216 calculates a first image stabilization coefficient from the ratio between the output signals of the LPF 211 and the LPF 212, and outputs a first image stabilization coefficient.

On the other hand, the acceleration detector 16 detects the accelerations in the x-axis direction, the y-axis direction, and the z-axis direction of FIG. 1A, and outputs acceleration signals. A BPF 213 applies a bandpass filter to the acceleration signals output from the acceleration detector 16 to extract signals in a specific frequency band and outputs the extracted signals. An integrator 205 integrates the output signals of the BPF 213 to calculate the velocity signals and outputs them. A translational shake calculator 401 calculates the image plane velocity of translational shake by multiplying the shake signals output from the integrator 205 by an image magnification (focal length/shooting distance).

A BPF 209 applies a bandpass filter to the angular velocity signals output from the angular velocity detector 15 to extract signals in a specific frequency band and output them. The frequency band of the filter of the BPF 209 is basically the same as that of the BPF 213. A HPF 210 outputs the output signals of the BPF 209 in phase with the output signal of the integrator 205 by applying a high-pass filter. However, if complete integration is performed in the integrator 205, the processing of the HPF 210 becomes unnecessary.

A comparator 217 calculates a second image stabilization coefficient from the ratio between the output signals of the translational shake calculator 401 and the BPF 210, and outputs it.

A subject information detector 214 detects and outputs the state of the subject to be photographed by the image capturing apparatus 1000 and the state of the image capturing apparatus 1000. The information of the subject includes brightness of the subject, moving velocity of the subject, contrast of the subject, pattern of the subject, movement of the background of the subject, movement of things other than the background of the subject, and so forth.

A shake information detector 215 receives the image plane velocity of angular shake (before reduction) 302 and the image plane velocity of translational shake (before reduction) 303 as inputs from the translational shake extractor 207, and outputs them as they are.

A determination unit 218 receives an output signal indicating the state of the subject and the state of the image capturing apparatus 1000 from the subject information detector 214, the image plane velocity of angular shake (before reduction) 302 and the image plane velocity of translational shake (before reduction) 303 from the shake information detector 215, the first image stabilization coefficient from the comparator 216, and the second image stabilization coefficient from the comparator 217. Then, the determination unit 218 determines whether to use the first image stabilization coefficient or the second image stabilization coefficient. The determination method by the determination unit 218 will be described below.

Basically, the determination unit 218 makes a judgment on the premise that the first image stabilization coefficient calculated based on the velocity of the image plane shake from the motion vector detector 201 is used. This is because the signal detected by the motion vector detector 201 has a wider measurable frequency band than the acceleration signal detected by the acceleration detector 16. The frequency band referred to here indicates a camera shake frequency band, which is generally 10 Hz or less.

However, there are situations in which the detection accuracy of the motion vector detector 201 drops. As the motion vector detector 201 searches for a feature point from the image signal and detects its moving velocity, there are some cases that the feature point cannot be detected precisely if the subject included in the image signal has a repetitive pattern, low contrast, or low brightness, which prevents accurate detection. Further, when a completely different subject appears in images between frames, the amount of movement of the feature point cannot be calculated, so that accurate detection cannot be performed. Therefore, in such a case, the second image stabilization coefficient calculated based on the acceleration signals from the acceleration detector 16 is used.

Based on the output signals of the subject information detector 214, the determination unit 218 determines low subject brightness, low subject contrast, repeated patterns of the subject, fast moving velocity of the subject, and fast movement of things other than the background, and in any of these cases, the determination unit 218 determines that the current situation is the situation in which the detection accuracy of the motion vector detector 201 may drop. If the determination unit 218 determines that the current situation is the situation in which the detection accuracy of the motion vector detector 201 may drop, the first image stabilization coefficient is not used and the second image stabilization coefficient is output.

The determination unit 218 also makes a judgment according to the ratio between the image plane velocity of angular shake (before reduction) and the image plane velocity of translational shake (before reduction). The image plane velocity of translational shake (before reduction) 303 is obtained by subtracting the image plane velocity of angular shake (before reduction) 302 from the output of the motion vector detector 201, as shown in FIG. 3. Therefore, if the image plane velocity of translational shake (before reduction) 303 is small, it may be buried in the detection errors of the motion vector detector 201, the angular velocity detector 15, and the image stabilization amount detector 208. Therefore, if there is a possibility that the image plane velocity of translational shake (before reduction) 303 may be buried in the detection error compared to the image plane velocity of angular shake (before reduction) 302, the determination unit 218 does not select the first image stabilization coefficient, and outputs the second image stabilization coefficient.

Upon comparing the image plane velocity of angular shake (before reduction) 302 and the image plane velocity of translational shake (before reduction) 303, instead of using the detected values, an estimated value of the image plane velocity of translational shake (before reduction) 303 may be used. For example, first, an average ratio between the sum of the image plane velocity of angular shake (after reduction) 301 and the image plane velocity of angular shake (before reduction) 302, and the image plane velocity of translational shake (before reduction) 303 is obtained. Then, using the obtained ratio, the image plane velocity of translational shake (before reduction) 303 is estimated from the obtained sum of the image plane velocity of angular shake (after reduction) 301 and the image plane velocity of angular shake (before reduction) 302. Then, the estimated image plane velocity of translational shake (before reduction) 303 is compared with the image plane velocity of angular shake (before reduction) 302 to determine whether or not there is a possibility that the image plane velocity of translational shake (before reduction) 303 is buried in the detection error. The average ratio between the sum of the image plane velocity of angular shake (after reduction) 301 and the image plane velocity of angular shake (before reduction) 302, and the image plane velocity of translational shake (before reduction) 303 alters depending on the shutter speeds. Therefore, the ratio is kept for each of the shutter speeds.

Also, whether or not the subject is moving can be estimated by estimating the image plane velocity of translational shake (before reduction) 303 from the sum of the image plane velocity of angular shake (after reduction) 301 and the image plane velocity of angular shake (before reduction) 302. If the output of the motion vector detector 201 is larger than a value obtained by adding the sum of the image plane velocity of angular shake (after reduction) 301 and image plane velocity of angular shake (before reduction) 302 and the estimated image plane velocity of translational shake (before reduction) 303, the subject may be moving. The estimation of whether or not the subject is moving is effective if the images of the moving subject are dominant in the images of frames output from the image sensor 6. If the subject is moving, the determination unit 218 does not use the first image stabilization coefficient, but uses the second image stabilization coefficient. The second image stabilization coefficient calculated based on the acceleration signals from the acceleration detector 16 can also be used to check whether the value of the first image stabilization coefficient deviates significantly except in situations where the shake due to shutter drive is large, such as during continuous shooting.

As a result of the judgment by the determination unit 218, the selected first image stabilization coefficient or second image stabilization coefficient is integrated in an integrator 219, and is multiplied by the angular velocity signals from the angular velocity detector 15 in a translational shake amount calculator 220, thereby converted into an amount of translational shake on the imaging surface.

Next, a flow of a calculation process of an amount of translational shake described above will be described with reference to a flowchart of FIG. 4.

Figure 4:
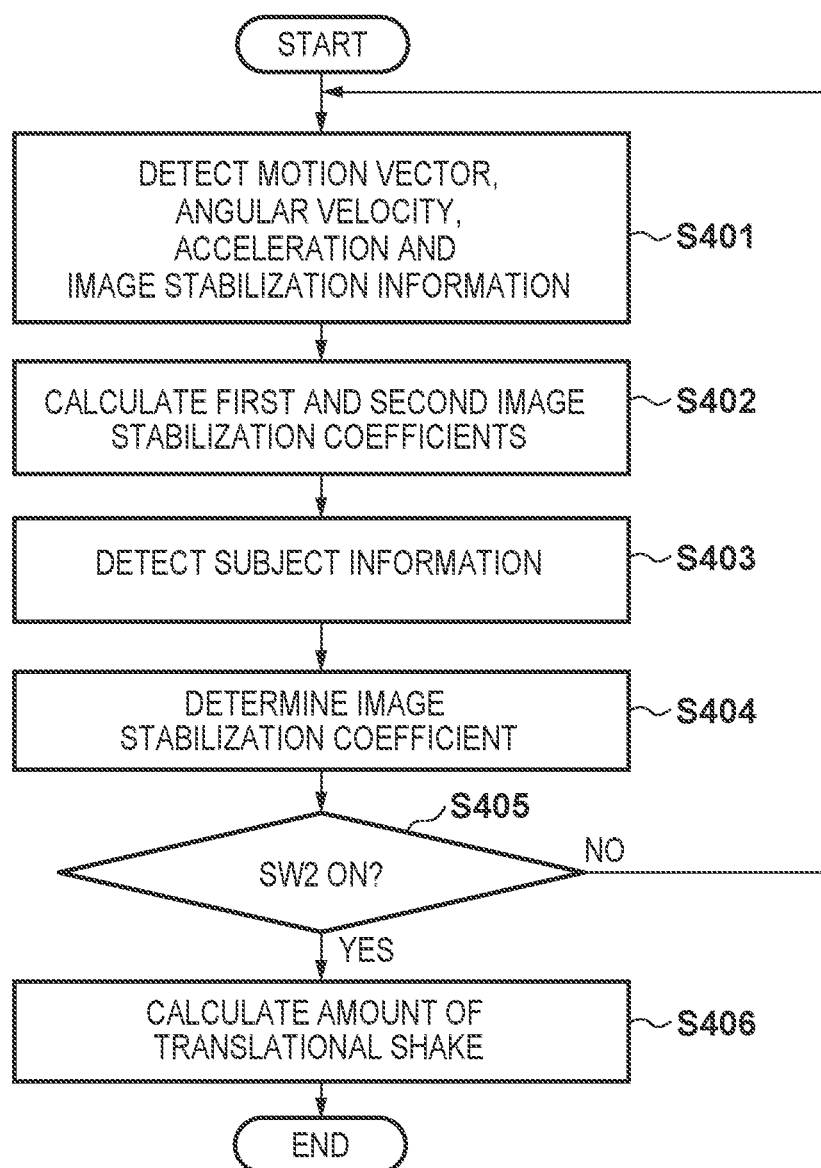
FIG. 4 is a flowchart showing a calculation process of an amount of translational shake according to the first embodiment.

The calculation process of an amount of translational shake shown in FIG. 4 starts when an aiming signal is input. The aiming signal is determined and input based on a signal from a finder (not shown), a signal from the angular velocity detector 15, and a signal from the switch SW1. At the same time as the start of this process, the image stabilization unit 14 and the lens actuator 13 start actuating the image sensor 6 and the image stabilization lens 9, respectively.

In step S401, motion vector detection by the motion vector detector 201, angular velocity detection by the angular velocity detector 15, acceleration detection by the acceleration detector 16 are performed, and an image plane velocity of angular shake after reduction, which is image stabilization information from the image stabilization amount detector 208, is obtained.

Next, in step S402, the first image stabilization coefficient and the second image stabilization coefficient are calculated as described above based on the information obtained in step S401.

In step S403, the subject information is detected from the subject information detector 214.

In step S404, the determination unit 218 determines to select the first image stabilization coefficient or the second image stabilization coefficient as described above based on the subject information obtained in step S403 and the state related to the shake of the image capturing apparatus 1000.

In step S405, it is determined whether or not the switch SW2 is ON. If the switch SW2 is OFF, the process returns to step S401. If the switch SW2 is ON, the process proceeds to step S406, and the translational shake amount calculator 220 calculates an amount of the image plane translational shake using the image stabilization coefficient selected in step S404. With the start of step S406, the image stabilization unit 14 and the lens actuator 13 actuates the image sensor 6 and the image stabilization lens 9 with control amounts corresponding to an amount of shake including the amount of translational shake. When the exposure is finished, the process is finished.

As described above, according to the first embodiment, the translational shake is detected by a plurality of methods, and the translational shake detected by the method selected according to the state of the subject and the state of the image capturing apparatus is selected, thereby it is possible to reduce the translational shake more accurately.

Second Embodiment

Next, a second embodiment of the present invention will be described. Since the configuration of the image capturing apparatus in the second embodiment is the same as that of the image capturing apparatus 1000 described with reference to FIGS. 1A, 1B, and 2, the description thereof will be omitted here.

In a case where the accuracy of the translational image stabilization is not very high, if the translational image stabilization is performed when an amount of the translational shake is small, the translational shake may be reduced too much, and the image quality may be deteriorated. Accordingly, in the second embodiment, a method of preventing deterioration of image quality by changing a gain used for obtaining a control amount for the translational image stabilization according to the shooting distance and the shutter speed will be described. The shooting distance referred to here is assumed to be dimensionless by dividing a shooting distance by the focal length, and is detected by the camera system control unit 5.

If it is desired to keep the shooting range constant regardless of the focal length, this can be achieved by making the dimensionless shooting distance have the same value. Further, in translational shake, when converting an amount of shake of the image capturing apparatus into a value on the imaging surface of the image capturing apparatus, the conversion can be accomplished by dividing the amount of shake by the dimensionless shooting distance. Because of these advantages, a dimensionless shooting distance is used.

The shutter speed is determined by the photographer's operation or calculated by the photometric function of the image capturing apparatus, and is input to the shutter actuator 18 to actuate the shutter mechanism 17. If the image sensor 6 has an electronic shutter function, the charge reset timing and charge read timing of the image sensor 6 may be controlled according to the shutter speed.

The amount of angular shake does not depend on the shooting distance, whereas the amount of translational shake differs depending on the shooting distance. Further, the shorter the shooting distance is, the larger the amount of translational shake is, and the longer the shooting distance is, the smaller the amount of translational shake is. Further, both of the amount of angular shake and the amount of translational shake are larger in a case where the shutter speed is slow than in a case where the shutter speed is fast. As described above, since the amount of angular shake does not change depending on the shooting distance, the control amount need only be changed depending on the shutter speed.

On the other hand, since the amount of translational shake changes depending on the shooting distance and the shutter speed, it is necessary to change the control amount in consideration of the shooting distance and the shutter speed. However, since the control amount corresponding to the amount of translational shake differs depending on the shooting distance, if there are a plurality of subjects and the shooting distances to the subjects are significantly different from each other, the amount of translational shake to be reduced cannot be determined, so the translational image stabilization is not performed. In that case, the translational shake is reduced by a method such that the translational shake is reduced for each area after shooting, for example.

Further, even in a case where the shooting distances of a plurality of subjects are significantly different from each other, if the AF mode of the image capturing apparatus is set so as to focus on the central point, for example, it is presumed that the photographer has an intention to shoot a subject in that point. Therefore, the translational image stabilization is performed.

It is desirable to calculate the control amount for the translational shake based on the translational shake that actually occurs during exposure to obtain the gain, but this is not possible because the total amount of shake during exposure is unknown until the end of exposure. Therefore, the gains with respect to the shooting distances and the shutter speeds are calculated in advance based on an average amount of translational shake, and are held as a table (hereinafter, referred to as "gain table"). When performing translational image stabilization, after determining the shooting distance and shutter speed, the gain for translational image stabilization is determined by referring to this gain table. Since the amount of translational shake varies depending on the posture of the photographer, the gain table may be updated according to the characteristics of the photographer. Further, since the amount of translational shake varies depending also on the posture of the photographer, gain tables corresponding to several amounts of translational shake may be prepared in advance and switched between them. Further, the gain tables may be switched according to the mode set by the photographer. As the mode, for example, a mode for selecting the strength of translational image stabilization, a macro shooting mode, and the like may be considered.

Further, the amount of translational shake during exposure may be estimated based on the amount of translational shake before the exposure, and the gain table to be referred to may be switched. From the tendency of the amount of translational shake before exposure, it may be determined that the amount of translational shake is large or small, and the table to be basically referred to may be updated.

Based on the amount of translational shake before exposure, the amount of translational shake during exposure that takes into account the shutter speed and shooting distance may be estimated, and the gain value may be calculated by comparing the estimated amount of translational shake with a predetermined reference amount of shake.

Here, the features of the table made from the shutter speed and the shooting distance will be described with reference to FIG. 5.

Figure 5:
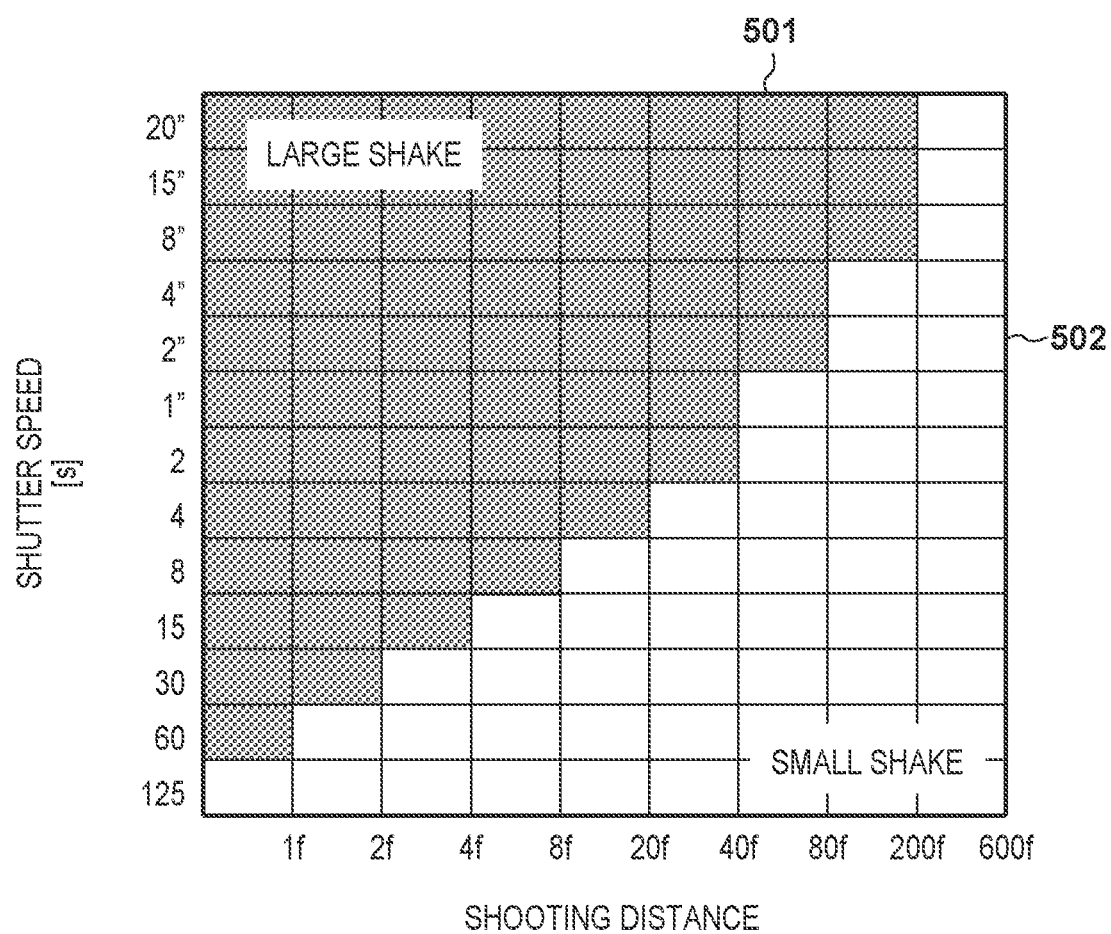
FIG. 5 is a diagram showing an example of a table for determining a gain value according to a second embodiment.

In FIG. 5, the horizontal axis represents the shooting distance and the vertical axis represents the shutter speed. A hatched region 501 is a region where the amount of shake is larger than the predetermined reference amount of shake, that is, a region where translational shake should be reduced. Even in the region 501, the amount of translational shake varies, and the amount of translational shake is larger in the region where the shooting distance is shorter and the shutter speed is slower. Therefore, the gain is increased in the part of the region 501 where the amount of translational shake is large.

On the other hand, a white region 502 is a region in which the amount of translational shake is equal to or less than the predetermined reference amount of shake. This region 502 is a region in which the translational image stabilization is not always necessary. However, since the amount of translational shake is included to some extent especially in the vicinity of the boundary between the region 501 and the region 502, the translational image stabilization may be performed in the vicinity of the boundary, and the gain may be determined according to the detection accuracy of the translational shake. For example, a higher gain may be set in a part of the region 502 close to the region 501, and a lower gain may be set in an other part of the region 501.

As described above, in a case where the detection accuracy of the translational shake is high, by putting a large gain value even for a region where the translational image stabilization is not essential, the effect of the translational image stabilization can be maximized.

The gain value may be set in any way. For example, 1 is set in the region where the translational image stabilization is essential, and a value close to 0 is set in the region where the translational image stabilization is not essential. When executing the translational image stabilization, the control amount for the detected translational shake is multiplied by the gain value.

Figure 6:
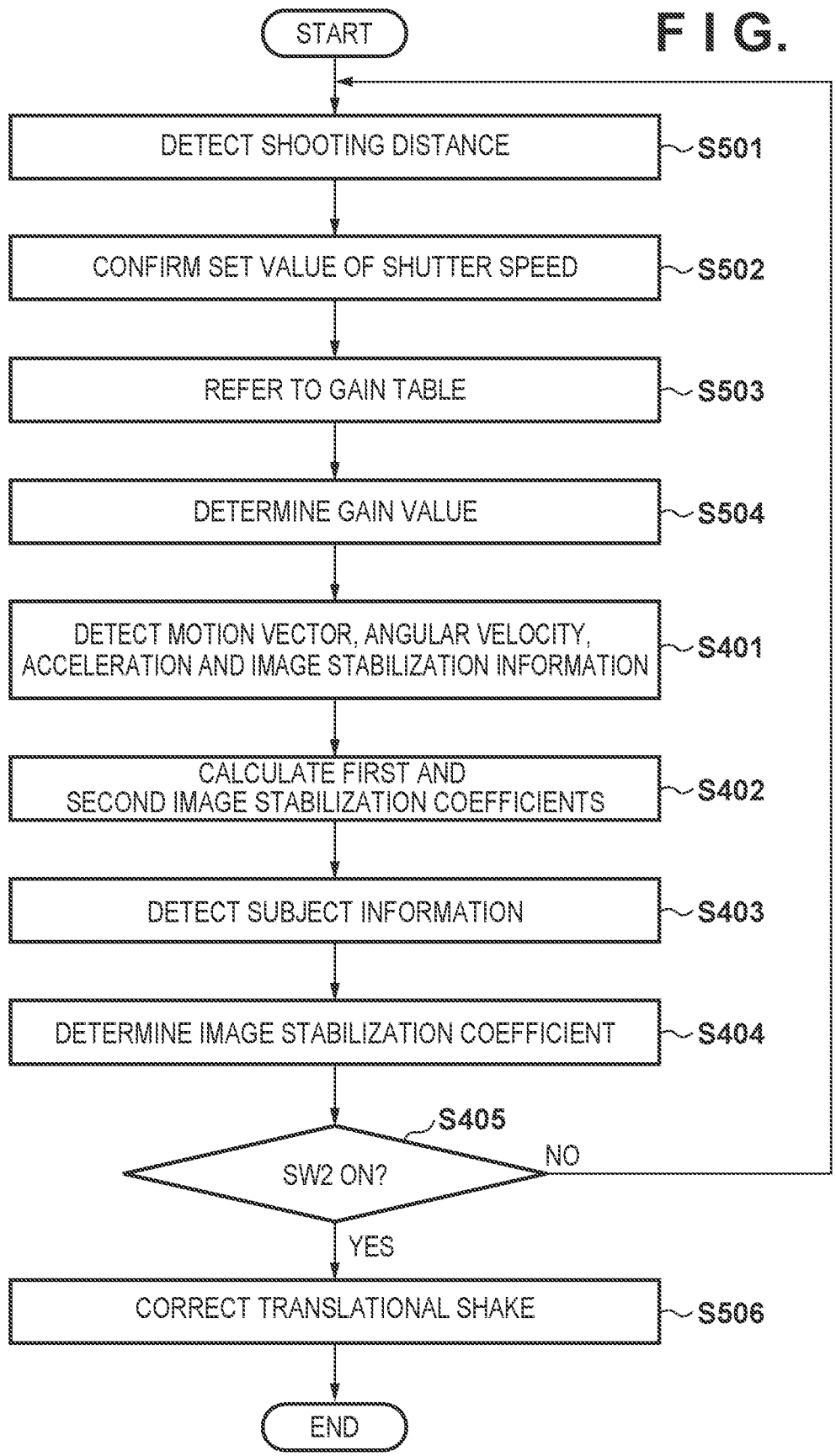
FIG. 6 is a flowchart showing a calculation process of an amount of translational shake according to the second embodiment.

Next, a flow of a calculation process of an amount of translational shake in the second embodiment will be described with reference to a flowchart of FIG. 6. The process shown in FIG. 6 starts when the power of the image capturing apparatus is turned ON or when the switch SW1 is turned on.

The shooting distance is detected in step S501, and a set value of the shutter speed is confirmed in step S502. In step S503, the gain table is referred to according to the characteristics of the photographer, the shooting mode, and the like, and in step S504, the gain value is determined according to the shooting distance and the shutter speed. After that, the processes of steps S401 to S404 of FIG. 4 are performed to select the correction coefficient, but detailed description thereof will be omitted here.

It is determined in step S405 whether or not the switch SW2 is turned on, and if it is turned on, the translational image stabilization is performed using the gain value determined in step S504 and the image stabilization coefficient selected in step S404. If it is determined that the switch SW2 is OFF in step S405, the process returns to step S501 again to determine a new gain value.

As described above, according to the second embodiment, in addition to the effects of the first embodiment, deterioration of image quality can be further suppressed.

Also in the second embodiment, the first image stabilization coefficient is obtained based on the motion vector detected by the motion vector detector 201 and the second image stabilization coefficient is obtained based on the acceleration detected by the acceleration detector 16 according to the configuration shown in FIG. 2, and one of them is selected and the gain is applied. However, the present invention is not limited to this, and the method for obtaining the amount of translational shake is not particularly limited. For example, the second embodiment may be applied to an image capturing apparatus having a configuration capable of obtaining only one of the first image stabilization coefficients and the second image stabilization coefficients described in the first embodiment. In addition, a method of second-order integration of acceleration detected by an acceleration sensor, an inertial navigation method, or the like can also be used.

Third Embodiment

Next, a third embodiment of the present invention will be described.

In the first embodiment described above, the method of calculating the first image stabilization coefficient using the motion vector detector 201 and the angular velocity detector 15 has been described. However, in a case where the motion vector detector 201 cannot detect the motion vector, in a case where the photographer is not firmly holding the image capturing apparatus, or in a case where the photographer is panning the image capturing apparatus, an error will affect the calculation of the amount of translational shake, and obtained result may be unstable.

In the third embodiment, a method of calculating the first image stabilization coefficient will be described in a case where the motion vector detector 201 cannot detect the motion vector, in a case where the photographer is not firmly holding the image capturing apparatus, or in a case where the photographer is panning the image capturing apparatus.

Figure 7:
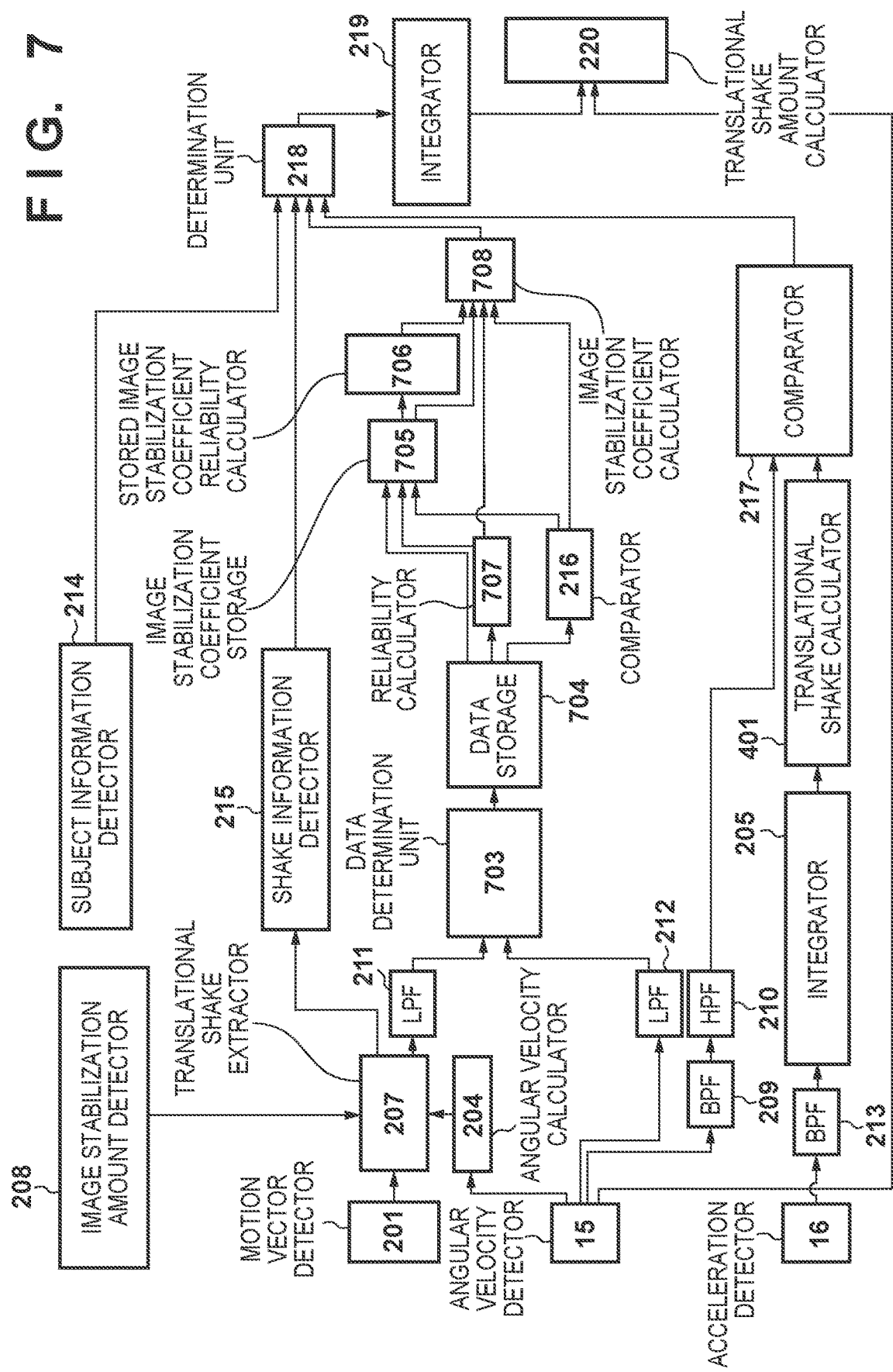
FIG. 7 is a block diagram showing a configuration for calculating an amount of translational shake according to a third embodiment.

The comparator 216 compares the output of the LPF 211 with the output of the LPF 212. In the first embodiment, the method of performing calculation using all the outputs of the LPF 211 and the LPF 212 has been described. On the other hand, in the third embodiment, a calculation method in a case where a situation in which the data cannot be acquired as described above may occur will be described with reference to FIG. 7. The constituents in FIG. 7 same as those in FIG. 2 are assigned the same reference numbers, and the description thereof will be omitted.

In the third embodiment, the outputs of the LPF 211 and the LPF 212 are input to a data determination unit 703. The data determination unit 703 determines whether at least one of the cases where the detection accuracy of the motion vector detector 201 is low, the motion vector detector 201 cannot detect the motion vector, the photographer is not firmly holding the image capturing apparatus, and the photographer is panning the image capturing apparatus occurs. If any of the above cases occurs, the data determination unit 703 outputs a flag together with the signals of the LPF 211 and the LPF 212, and outputs the signals of the LPF 211 and the LPF 212 otherwise.

A data storage 704 stores the output of the data determination unit 703 as time-series data including the flag. The comparator 216 calculates the first image stabilization coefficient from the ratio between the output signals of the LPF 211 and LPF 212 output from the data storage 704. At this time, the comparator 216 inputs the output signals of the LPF 211 and LPF 212, corresponding to the total number of data including data with a flag and data without a flag obtained during the period of time corresponding to the shutter speed. Then, the first image stabilization coefficient is calculated using only the data without a flag. This is because the image stabilization effect is higher when the first image stabilization coefficient is calculated using the data obtained during the period of time corresponding to the shutter speed. However, depending on the data sampling cycle, the number of data will be small when the shutter speed is fast. In such a case, the first image stabilization coefficient is calculated using the data obtained in a longer period of time than a period of time corresponding to the shutter speed.

The output signal from the data storage 704 is input to a reliability calculator 707, and the reliability of the first image stabilization coefficient calculated by the comparator 216 is calculated. The reliability is obtained by comparing the maximum number of data that can be used to calculate the first image stabilization coefficient with the number of data that can be used to calculate the current first image stabilization coefficient. For example, if the number of data that can be used to calculate the first image stabilization coefficient is reduced to half or less, the reliability of the first image stabilization coefficient becomes considerably low, so the first image stabilization coefficient calculated in the past is also used for the final calculation of the first image stabilization coefficient. Further, for example, the reliability may be obtained from the number of data that can be used currently with respect to the number of data with which a first image stabilization coefficient can be obtained stably. That is, the reliability is not limited to those described above as long as it is possible to calculate whether or not the number of data that can be used for the calculation of the current correction coefficient is reliable, and the calculation method thereof is not limited.

The output signal of the data storage 704, the first image stabilization coefficient calculated by the comparator 216, and the reliability calculated by the reliability calculator 707 are input to an image stabilization coefficient storage 705. Then, if a flag is set to the immediately previous data with respect to the latest data, no flag is set to the latest data, and the reliability calculated by the reliability calculator 707 is equal to or higher than a certain value, the first image stabilization coefficient is stored.

A stored image stabilization coefficient reliability calculator 706 updates the reliability of the first image stabilization coefficient stored in the image stabilization coefficient storage 705. This is because the reliability of the first image stabilization coefficient stored in the image stabilization coefficient storage 705 is considered to decrease over time. Therefore, the stored image stabilization coefficient reliability calculator 706 measures the elapsed time from the time at which the first image stabilization coefficient is stored in the image stabilization coefficient storage 705, and performs a calculation to lower the reliability according to the elapsed time. The calculation of the reliability coefficient performed at this time may be a linear calculation or a non-linear calculation.

An image stabilization coefficient calculator 708 calculates the final first image stabilization coefficient from the outputs of the reliability calculator 707, the comparator 216, the image stabilization coefficient storage 705, and the storage correction coefficient reliability calculator 706. Specifically, the image stabilization coefficient calculator 708 outputs the first image stabilization coefficient output from the comparator 216 as the final first image stabilization coefficient if the reliability output from the reliability calculator 707 is equal to or higher than a certain threshold value. On the other hand, if the reliability output from the reliability calculator 707 is lower than the certain threshold value and the reliability output from the stored image stabilization coefficient reliability calculator 706 is equal to or higher than the certain threshold value, then the first image stabilization coefficient output from the comparator 216 and the first image stabilization coefficient stored in the image stabilization coefficient storage 705 are weighted and averaged according to their reliabilities, and the result is outputted as the final first image stabilization coefficient. If the reliability output from the reliability calculator 707 is lower than the certain threshold value and the reliability output from the storage correction coefficient reliability calculator 706 is also lower than the certain threshold value, 0 is output as the first image stabilization coefficient.

After that, the determination unit 218 determines whether to use the first image stabilization coefficient or the second image stabilization coefficient in the manner as described in the first embodiment.

Figure 8:
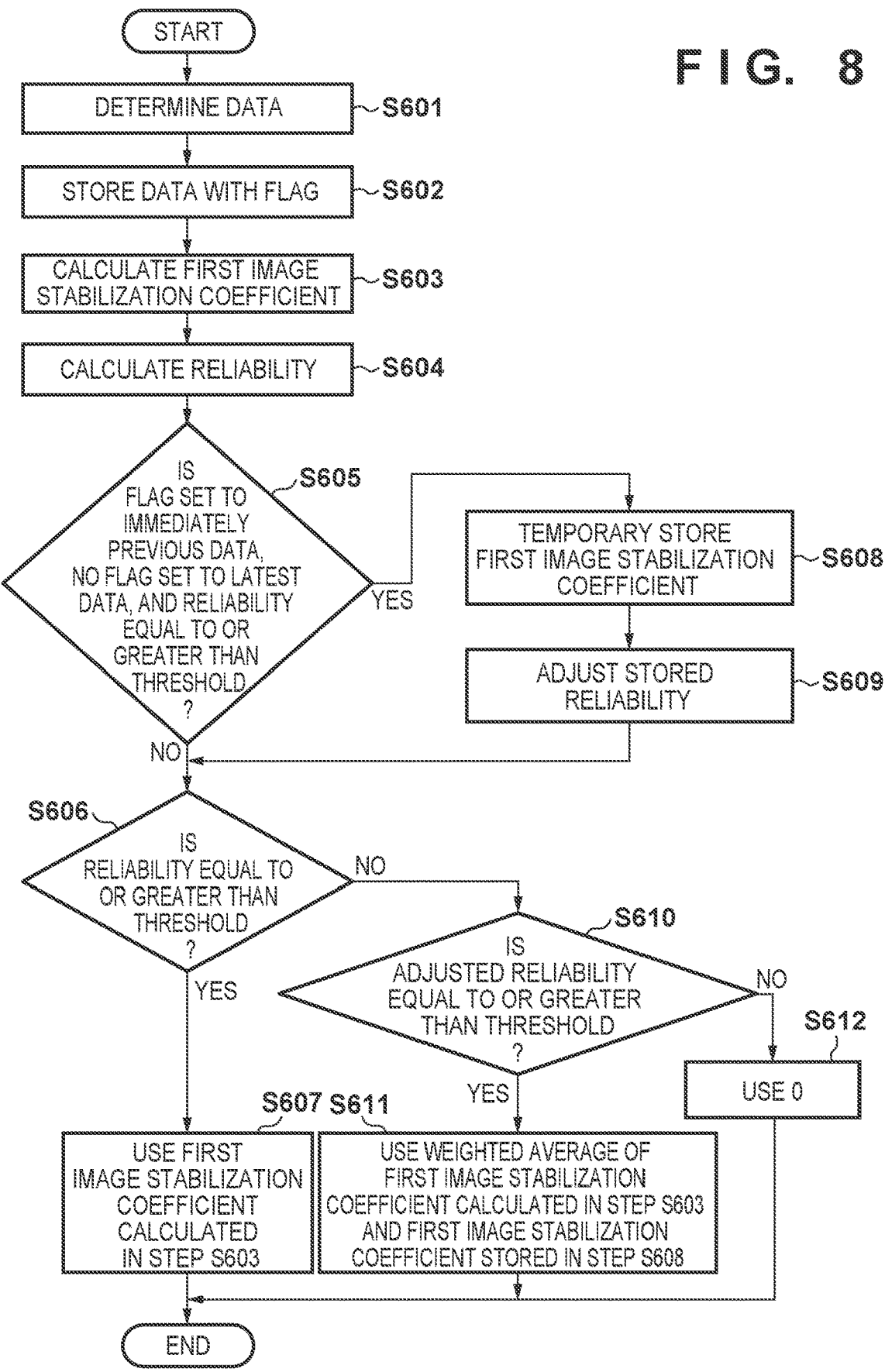
FIG. 8 is a flowchart showing a calculation process of a first correction coefficient according to the third embodiment.

Next, the flow of processing performed by the image stabilization coefficient calculator 708 in the third embodiment will be described with reference to a flowchart of FIG. 8. This processing is performed as arithmetic processes of the first image stabilization coefficient performed in step S402 of FIG. 4.

In step S601, the data determination unit 703 determines whether at least one of the conditions that the detection accuracy of the motion vector detector 201 is low, the motion vector detector 201 cannot detect the motion vector, the photographer is not firmly holding the image capturing apparatus, and the photographer is panning the image capturing apparatus is met.

Then, in step S602, if it is determined in step S601 that any of the conditions is met, the data storage 704 stores the flag together with the output signals of the LPF 211 and the LPF 212. If none of the conditions is met, the output signals of LPF 211 and LPF 212 are saved.

In step S603, the comparator 216 calculates the first image stabilization coefficient from the output signals, with no flag, of the LPF 211 and the LPF 212.

In step S604, the reliability calculator 707 calculates the reliability of the first image stabilization coefficient calculated by the comparator 216.

Next, in step S605, the image stabilization coefficient storage 705 determines whether or not a flag is set to the immediately previous data from the latest data, no flag is set to the latest data, and the reliability obtained by the reliability calculator 707 is equal to or greater than a certain value. If the above conditions are met, the process proceeds to step S608, and if not, the process proceeds to step S606.

In step S608, the image stabilization coefficient storage 705 stores the first image stabilization coefficient and proceeds to step S609. In step S609, the reliability is adjusted according to the passage of time in the stored image stabilization coefficient reliability calculator 706.

In step S606, the image stabilization coefficient calculator 708 determines whether the reliability is equal to or greater than the threshold value. If the reliability is equal to or greater than the threshold value, the process proceeds to step S607, and the first image stabilization coefficient calculated in step S603 is used as the final first image stabilization coefficient.

On the other hand, if the reliability is less than the threshold value, the process proceeds to step S610, and the image stabilization coefficient calculator 708 determines whether or not the reliability adjusted in step S609 is equal to or greater than a threshold value. If the adjusted reliability is equal to or greater than the threshold value, the process proceeds to step S611, and the first image stabilization coefficient obtained in step S603 and the first image stabilization coefficient stored in the image stabilization coefficient storage 705 in step S608 are weighted and averaged based on their respective reliabilities to calculate the final first image stabilization coefficient.

If the adjusted reliability is less than the threshold value in step S610, the process proceeds to step S612, and the final first image stabilization coefficient is set to 0. Here, 0 may be used so that the correction is not performed, or a signal indicating that the image stabilization cannot be performed by this method may be output.

When the first image stabilization coefficient is determined, the process ends.

As described above, according to the third embodiment, in addition to the effect of the first embodiment, it is possible to further suppress the detection error of the translational shake based on the motion vector.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-017743, filed Feb. 5, 2021 which is hereby incorporated by reference herein in its entirety.

What is claimed is:

1. An image stabilization apparatus comprising at least one processor and/or circuitry which functions as:
   a motion vector detector that detects a motion vector from images repeatedly output from an image sensor;
   a first calculator that calculates a first image stabilization coefficient to be used for calculating an amount of translational shake based on the motion vector and an angular velocity of shake of an image capturing apparatus;
   a second calculator that calculates a second image stabilization coefficient to be used for calculating an amount of translational shake based on acceleration and the angular velocity of shake of the image capturing apparatus;
   a determination unit that selects either of the first image stabilization coefficient or the second image stabilization coefficient based on information about accuracy of detection of the motion vector by the motion vector detector; and
   a translational shake calculator that calculates an amount of translational shake using the first image stabilization coefficient or the second image stabilization coefficient selected by the determination unit,
   wherein, in a case where the information indicates that the accuracy is low, the determination unit selects the second image stabilization coefficient, and select the first image stabilization coefficient otherwise.

2. The image stabilization apparatus according to claim 1, wherein the information includes information on whether or not any of the images include a repetitive pattern, contrast of the images, brightness of the images, movement of a subject in the images, and state of background of the images, and the determination unit determines that the accuracy is low if the information indicates any of states that any of the images includes a repetitive pattern, the contrast is lower than a predetermined contrast, the brightness is lower than a predetermined brightness, the movement of the subject is larger than a predetermined movement, movement of the background is larger than a predetermined movement.

3. The image stabilization apparatus according to claim 1, wherein the determination unit determines that the accuracy is low if a ratio of image plane velocity of translational shake on an imaging plane of the image sensor calculated in the past based on the motion vector used for calculating the first image stabilization coefficient to image plane velocity of angular shake on the imaging plane of the image sensor calculated based on the angular velocity of shake of the image capturing apparatus is lower than a predetermined ratio.

4. The image stabilization apparatus according to claim 1, wherein the determination unit estimates image plane velocity of translational shake on an imaging plane of the image sensor from image plane velocity of angular shake on the imaging plane of the image sensor calculated based on newly detected angular velocity, based on a ratio between image plane velocity of angular shake calculated in the past based on the angular velocity of shake of the image capturing apparatus and image plane velocity of translational shake calculated in the past based on the motion vector for calculating the first image stabilization coefficient, and the determination unit determines that the accuracy is low if a ratio of the estimated image plane velocity of translational shake to the image plane velocity of angular shake used for the estimation is lower than a predetermined ratio.

5. The image stabilization apparatus according to claim 1, further comprising at least one processor and/or circuitry which functions as a gain unit that determines a gain based on a shutter speed at a time of shooting an image and a shooting distance, and applies the gain to the first image stabilization coefficient or the second image stabilization coefficient selected by the determination unit,
   wherein the translational shake calculator calculates the amount of translational shake using the gained first image stabilization coefficient or the gained second image stabilization coefficient.

6. The image stabilization apparatus according to claim 5, wherein the gain unit makes the gain larger in a case where the shutter speed is a first shutter speed than in a case where the shutter speed is a second shutter speed which is faster than the first shutter speed.

7. The image stabilization apparatus according to claim 5, wherein the gain unit makes the gain larger in a case where the shooting distance is a first shooting distance than in a case where the shooting distance is a second shooting distance which is longer than the first shooting distance.

8. The image stabilization apparatus according to claim 5, further comprising a gain table that stores gains corresponding to a plurality of different shutter speeds and a plurality of different shooting distances,
   wherein the gain unit determines the gain by referring to the gain table.

9. The image stabilization apparatus according to claim 8, further comprising a plurality of the gain tables corresponding to modes of the image capturing apparatus and characteristics of photographers,
   wherein, among the plurality of gain tables, the gain unit refers to a gain table corresponding to a mode of the image capturing apparatus and characteristics of a photographer.

10. The image stabilization apparatus according to claim 1, further comprising at least one processor and/or circuitry which functions as:
    a reliability calculator that calculates reliability of the first image stabilization coefficient;
    a storage that holds the first image stabilization coefficient and the reliability of the first image stabilization coefficient;
    an adjustor that adjusts the reliability stored in the storage according to passage of time since the reliability is stored; and
    a third calculator that calculates the first image stabilization coefficient to be input to the determination unit out of the first image stabilization coefficient newly calculated by the first calculator and the first image stabilization coefficient stored in the storage based on reliability of the newly found first image stabilization coefficient and the reliability adjusted by the adjustor.

11. The image stabilization apparatus according to claim 10, wherein the third calculator
    selects the newly found first image stabilization coefficient if the reliability of the newly found first image stabilization coefficient is equal to or greater than a first threshold,
    weights and averages the newly found first image stabilization coefficient and the stored first image stabilization coefficient based on the reliability of the newly found first image stabilization coefficient and the adjusted reliability if the reliability of the newly found first image stabilization coefficient is less than a third threshold and if the adjusted reliability is equal to or greater than a second threshold, and does not output the first image stabilization coefficient if the reliability of the newly found first image stabilization coefficient is less than the third threshold and if the adjusted reliability is less than the second threshold.

12. The image stabilization apparatus according to claim 10, wherein the adjustor reduces the reliability according to passage of time since the reliability is stored in the storage.

13. The image stabilization apparatus according to claim 10, wherein the first calculator calculates the first image stabilization coefficient based on a plurality of motion vectors output during a period corresponding to shutter speed except for a motion vector whose detection accuracy is indicated as low in the information.

14. The image stabilization apparatus according to claim 10, wherein, in a case where shutter speed is faster than a predetermined shutter speed, the first calculator calculates the first image stabilization coefficient based on a plurality of motion vectors output during a period longer than a period corresponding to the shutter speed except for a motion vector whose detection accuracy is indicated as low in the information.

15. The image stabilization apparatus according to claim 1,
wherein the translational shake calculator calculates the amount of translational shake based on the first image stabilization coefficient or the second image stabilization coefficient selected by the determination unit and the angular velocity.

16. An image capturing apparatus comprising:
an image sensor; and
an image stabilization apparatus that comprises at least one processor and/or circuitry which functions as:
a motion vector detector that detects a motion vector from images repeatedly output from the image sensor;
a first calculator that calculates a first image stabilization coefficient to be used for calculating an amount of translational shake based on the motion vector and an angular velocity of shake of the image capturing apparatus;
a second calculator that calculates a second image stabilization coefficient to be used for calculating an amount of translational shake based on acceleration and the angular velocity of shake of the image capturing apparatus;
a determination unit that selects either of the first image stabilization coefficient or the second image stabilization coefficient based on information about accuracy of detection of the motion vector by the motion vector detector; and
a translational shake calculator that calculates an amount of translational shake using the first image stabilization coefficient or the second image stabilization coefficient selected by the determination unit,
wherein, in a case where the information indicates that the accuracy is low, the determination unit selects the second image stabilization coefficient, and selects the first image stabilization coefficient otherwise.

17. An image stabilization method comprising:
detecting a motion vector from images repeatedly output from an image sensor;
obtaining an angular velocity of shake of an image capturing apparatus;
calculating a first image stabilization coefficient to be used for calculating an amount of translational shake based on the motion vector and the angular velocity;
calculating a second image stabilization coefficient to be used for calculating an amount of translational shake based on acceleration and the angular velocity of shake of the image capturing apparatus;
selecting either of the first image stabilization coefficient or the second image stabilization coefficient based on information about accuracy of detection of the motion vector; and
calculating an amount of translational shake using selected one of the first image stabilization coefficient or the second image stabilization coefficient,
wherein, the second image stabilization coefficient is selected in a case where the information indicates that the accuracy is low, and the first image stabilization coefficient is selected otherwise.

* * * * *